Oct. 27, 1925.

L. H. STEIN 1,559,195

MACHINE FOR SOLDERING

Filed Sept. 19, 1921

2 Sheets-Sheet 1

Inventor
Louis H. Stein
By Brown Boettcher Dunner
Attorneys

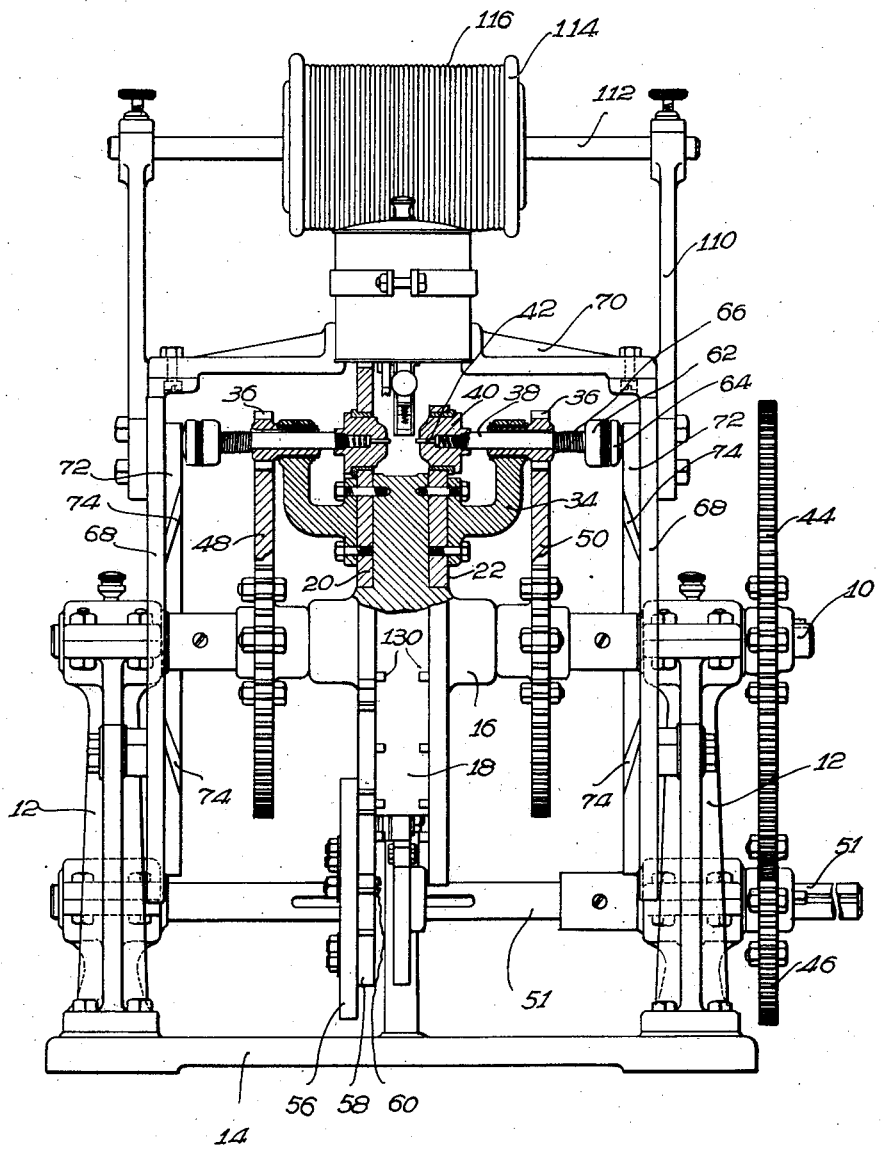

Patented Oct. 27, 1925.

1,559,195

UNITED STATES PATENT OFFICE.

LOUIS H. STEIN, OF CHICAGO, ILLINOIS, ASSIGNOR TO STROMBERG MOTOR DEVICES COMPANY, OF CHICAGO, ILLINOIS, A CORPORATION OF ILLINOIS.

MACHINE FOR SOLDERING.

Application filed September 19, 1921. Serial No. 501,572.

*To all whom it may concern:*

Be it known that I, LOUIS H. STEIN, a citizen of the United States, residing at Chicago, in the county of Cook and State of Illinois, have invented a certain new and useful Improvement in Machines for Soldering, of which the following is a full, clear, concise, and exact description, reference being had to the accompanying drawings, forming a part of this specification.

My invention relates to a manufactured article in which the parts are united by solder at certain points, and more specifically to an improved method and machine for uniting such parts. In the particular embodiment illustrated, the elements to be united are defined by surfaces of revolution, at least where the joint is to be formed.

One object of my invention is to increase production by performing each of the steps of the process of forming the soldered joint in the shortest possible time consistent with good results.

The forming of such joints by hand is not only objectionable on account of the time consumed, but the amount of flux and solder used, and the amount of heat applied, as well as the time factors of manipulation, are highly variable, so that the output of even a skilled workman is far from uniform.

Another object of my invention, therefore, is to perform the steps with respect to which uniformity is essential, automatically.

Another object is to provide automatic means for performing the steps involved, such that the operation may be readily observed.

Another object is to provide for such quick and ready adjustment of the means for performing the steps involved, that the judgment of a skilled workman operating the machine, as to the proper amount of solder and flux, and the proper application thereof, may be substantially as quickly and surely effected as when the process is all performed by hand.

Another object is to provide mechanical apparatus of extreme simplicity, for performing the above named operations in plain sight and under the constant control of the operator, at speeds which need be limited only by the inherent limitations of the process itself, rather than the operating capabilities of the mechanism.

Further objects and advantages of my invention will become apparent as the description proceeds.

Figure 3:
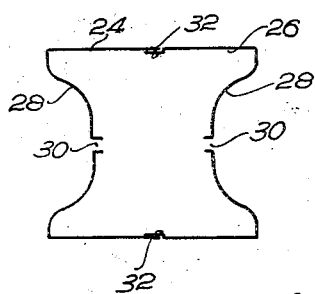
Figure 1:
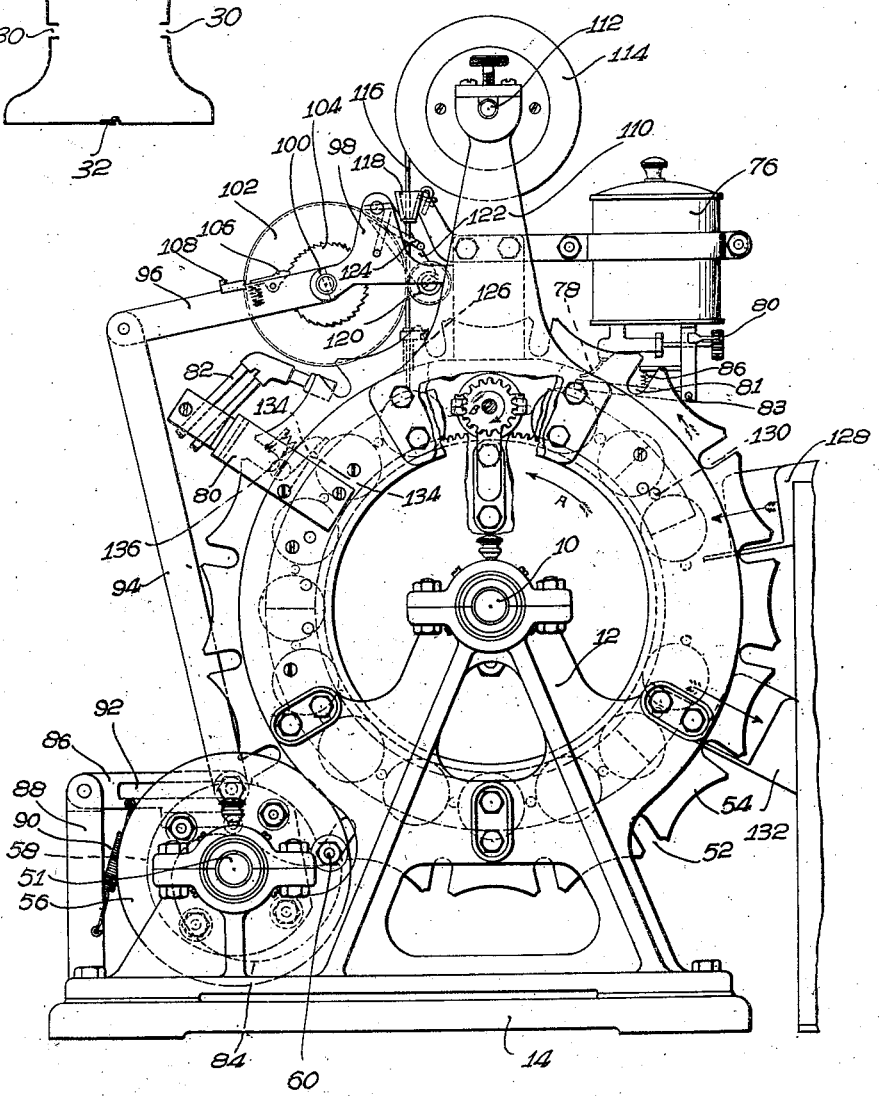

In the accompanying drawings:

Figure 1 is an end, and Fig. 2 a side elevation partly in section of apparatus constructed according to my invention; and Fig. 3 is a detailed section of one of the parts handled by the machine illustrated.

According to my invention, the parts necessary to form each completed article are juxtaposed and automatically moved into and through a plurality of predetermined positions, in certain of which positions they are exposed to the action of various devices for performing in proper sequence the steps of the soldering operation. I furthermore make this movement intermittent, bringing each partly completed article into position to be acted on by means for performing one of the steps of the process, and permitting it to remain there for a predetermined length of time before moving on. The surfaces to be united being surfaces of revolution, I revolve the article about the axis of these surfaces, to continuously expose the entire surface to the action of the device at the particular station involved. In the particular embodiment illustrated, the intermittent movement from one station to the next, automatically results in a substantial interruption of the rotation of the article about its axis during movement. This, however, is optional.

Referring to the drawings, the main shaft 10 is journaled in the upper ends of suitable standards 12 rising from the base 14, and carries a centrally located sleeve 16, free to rotate thereon. Sleeve 16 carries a flange 18 integral therewith, to which flange are bolted carrier plates 20 and 22. The article to be formed by the machine illustrated is a carbureter float (see Figure 3) constructed of two halves 24 and 26, each having a depression 28 in its outer face and an axial aperture 30. Part 26 is further crimped in as at 32 to provide a shoulder and inset flange for receiving the edge of part 24, to produce what I term a telescopic joint. This shoulder and flange are to be soldered to the edge of part 24 to unite the two parts of the float.

Each of plates 20 and 22 carries a plurality of brackets 34 in which are journaled the elongated hubs of pinions 36 keyed on shafts 38, which shafts carry heads 40 journaled in suitable apertures in plates 20 and 22. The opposed inner faces of heads 40 are suitably shaped to fit the contours of the two parts 24 and 26 of the floats. It will be noted that the shape of the floats is peculiarly well adapted to the present method of handling since there is an axial dishing or depression at the ends and a central hole 30 by which the floats may be readily centered. I preferably also provide spring pressed tits 42 arranged to enter apertures 30 and assist in holding and rotating the float.

Shaft 10 is continuously rotated in the direction indicated by arrow A in Figure 1, by suitable means such as gear 44 connecting with gear 46 on drive shaft 51, which for the present purpose may be considered a source of power. Gears 48 and 50 are keyed on shaft 10 to rotate therewith, and mesh with all the pinions 36 carried on plates 20 and 22 respectively. It will be obvious that when plates 20 and 22 are stationary, movement of gear 50 in the direction of arrow A, will rotate the pinion 36 in the direction of arrow B.

Plates 20 and 22 receive an intermittent step by step motion from Geneva gearing carried by shaft 51. For this purpose, plate 20 is provided with peripheral notches 52 for engaging the driving pin of the Geneva gear, and concave portions 54 for engaging the periphery of the holding plate. The Geneva gear comprises the main supporting plate 56 which carries the holding plate 58 and the driving pin 60.

Shafts 38 have tips 62 carrying ball-bearing contact buttons 64, and are splined in pinions 36 and normally resiliently urged from each other by coiled springs 66. Standards 12 support a framework composed of large annular plates 68 braced at their upper extremities by a bridge 70, and supporting annular cams 72 provided with beveled ends 74 arranged to make contact with buttons 64 and force heads 40 into the position illustrated in Figure 2 during a predetermined portion of each revolution of plates 20 and 22. Throughout a small portion of each revolution, however, buttons 64 will ride off cam 72 into contact with supporting plate 68, and permit heads 40 to separate so that the finished floats held thereby may be withdrawn and unfinished floats inserted.

Means are provided at one of the stations at which each float will come to rest during its progress through the machine, for applying a suitable flux. I have illustrated a container 76 provided with a discharge nozzle 78, the flow through which nozzle is adjusted by means of a valve having the knurled operating button 80. An arm 81 pivoted at 83 is adapted to lie in the path of the floats. This arm carries a suitable pad of felt or similar substance at its free end which is normally pressed down into contact with the seam 32 of the adjacent float. Nozzle 78 terminates just above the felt pad, and the rate of discharge may be readily observed as the material drops from the nozzle onto the felt pad.

After the joint of the float has been treated with flux, it is exposed to the action of a jet of flame, and simultaneously receives a suitable supply of solder on the surfaces of the joint. A frame or bridge 80 supports a gas torch indicated at 82. The means for leading solder to the float under the gas torch comprises a cam 84 on shaft 51 operating to oscillate a rocker 86 pivoted on a supporting post 88 and normally held in lowered position by a spring 90. A slot 92 receives the terminal bolt of pitman 94, which pitman oscillates the forwarding arm 96.

Brackets 98 support the pintle 100 for a friction disk 102 rigid with ratchet 104 operatively associated with a pawl 106 on arm 96. A slide 108 is arranged to ride over the rear end of pawl 106 to lock it in inoperative position. Standards 110 rising above the ends of bridge 70 support a cross shaft 112 upon which a suitable spool 114 of solder wire is free to rotate and slide longitudinally. The solder wire 116 is led downwardly through a guide 118 between friction disk 102 and a small cooperating friction roller 120 carried on the end of a pivoted arm 122 and resiliently pressed against the disk by a spring 124. A small tube 126 is preferably provided to further guide the wire 116 against the float.

Immediately after receiving the solder, and before the solder has completely cooled and become rigid, the float is moved under a pivoted wiper 134 resiliently pressed against the same by a suitable spring 136.

An inlet chute 128 is arranged at an incline to deliver floats by gravity to the space between the outer portions of plates 20 and 22. Each plate carries a series of inwardly projecting studs 130, the incoming float riding on the studs and on the outer periphery of flange 18 until it is picked up by heads 40. An inclined outlet chute 132 is provided into which the finished floats will fall as they are liberated by the separation of heads 40 when buttons 64 ride off cam surfaces 74.

The operation of the device is as follows:

The floats are hand-assembled in the condition indicated in Figure 3, the free edges of parts 24 and 26 being first preferably pressed against an absorbent pad saturated with flux, so as to work the flux in between the edge of part 24 and the inset 32, and in this condition, they are placed in chute 128. Pitman 94, if not already in adjustment, is properly adjusted in slot 92 to feed solder at the desired rate. The gas torch 82 is adjusted to deliver a flame of suitable size and shape, which, when there are no floats in the machine, plays harmlessly in the space between heads 40. Nozzle 78 is adjusted to discharge flux and the machine is started by rotating shaft 51. The floats received from chute 128 are carried up and to the left and the first float will be positioned to receive flux at the second pause in this instance. Before the fourth pause, when the first float will come under the flame from gas torch 82, slide 108 is withdrawn so that wire 116 will be fed downwardly as the float revolves under the end of it. It should be noted that the surface of the float moves under the gas flame and comes in contact with the solder as it leaves the flame, or with most positions of adjustment, the end of wire 116 is in the edge of the flame. The next movement of the plates will carry the soldered float under wiper 134 where the solder will be properly distributed and smoothed.

It will be apparent that in each of the positions through which the float passes, it will pause while plates 20 and 22 are held stationary by holding plate 58, and rotate about its own axis because of the continuous movement of gears 48 and 50. During the movement from one position to the next, plates 20 and 22 will rotate in the same direction as gears 50 and 48 at substantially the same speed, thus eliminating relative movement between the two, and relatively stopping rotation of the float.

During the following eight pauses, the finished float will cool until when it finally drops into chute 132, the solder has solidified and the assembled float may be handled without injury to it.

Without further elaboration, the foregoing will so fully explain the gist of my invention that others may, by applying current knowledge, readily adapt the same for use under various conditions of service without eliminating certain features, which may properly be said to constitute the essential items of novelty involved. It will, for instance, be obvious that while I have illustrated a particular shape of article, the machine is not limited to the shape disclosed, as a large variety of articles of different shapes may, and are intended to be assembled in machines constructed according to my invention. Changes in shape, size, and other details may readily be made without eliminating the essential items of novelty intended to be defined and secured to me by the following claims.

I claim:

1. In a device of the class described, a rotatable carrier having a peripheral annular slot, means for delivering an article by gravity to said slot, and projections from the walls of said slot arranged to engage said article and cooperate with the bottom of the slot to support the article and carry it away from said delivery means.

2. In combination, a carrier equipped with a groove, gripping devices on said carrier for engaging articles in said groove, means for dropping articles into said groove, means for advancing said gripping devices to hold said articles, and means for retracting said gripping devices to permit said articles to fall out of said groove by gravity.

3. In combination, a carrier equipped with a groove, rotatable gripping devices on said carrier for engaging articles in said groove, means for dropping articles into said grooves, projections in the walls of said grooves for supporting said articles in approximate alinement with said gripping devices, and means for advancing said gripping devices after said articles have been deposited.

4. In a device of the class described for performing work on an article comprising two half portions separated by an annular slot, a flame projecting device, means for rotating the article in the said flame, the said slot of the article being rotated directly in the path of the said flame, means including a solder supply for feeding solder into the said slot while same is out of the path of the said flame, a wiper, and means for subsequently moving the soldered article completely out of the path of the said flame into the path of the wiper, the said wiper removing the excess solder from the said slot.

5. In combination, a carrier, a pair of spaced and oppositely opposed gripping devices supported by the said carrier, the said gripping devices being adapted to grip an article comprising two half portions positioned therebetween, means for indexing the gripping devices about the axis of the carrier, means for effecting the rotation of the said gripping devices when in a stationary position, and means for causing the said gripping devices to release the said article at predetermined time to permit it to be gravitated from the said carrier.

6. In combination, a carrier upon the periphery of which articles are supported, the said periphery defining an annular depression in which the articles are positioned, gripping devices associated with the said carrier for engaging articles thereon, means for causing said gripping devices to engage the said articles at a predetermined time, means for indexing the carrier through a plurality of positions in each of which work is performed on the said article, and means for causing the said gripping devices to release the said articles at a predetermined time, permitting them to be ejected from the carrier.

7. In combination, a carrier having a peripheral annular depression, means for causing an article to be delivered into the said depression, means for indexing the carrier, rotatable means adapted to engage the article in the said depression, means for actuating the said rotatable means when the said carrier is stationary, the said carrier being adapted to carry the article through a plurality of different positions, means in each position for performing work on the said article, means for disengaging the rotatable means from the article at a predetermined time, and means for causing the said article to be ejected from the said depression when the said rotatable means is disengaged therefrom.

8. In combination, a carrier having a peripheral annular depression, means for causing an article to be delivered into the said depression, means for indexing said carrier, rotatable means adapted to engage the article in the said depression, means for actuating the said rotatable means when the said carrier is stationary, the said carrier being adapted to convey the article through a plurality of different positions, means in one position for applying solder to the said article and for subjecting the said article to a projected flame, means in another position for wiping off the excess solder, means for disengaging the rotatable means from the article after work has been performed thereon, and means for causing the said article to be ejected from the said depression when the said rotatable means is disengaged therefrom.

9. In combination, a rotatable carrier having a peripheral annular depression, means for delivering an article to the said depression, projections from the walls of said depression arranged to engage said article and co-operate with the bottom of the depression to support the article and carry it away from the said delivery means, a flame projecting device, means for rotating the article in the flame, and means for feeding solder to the surface of the article as said surface is carried out of the flame by rotation of the article.

10. In combination, a rotatable carrier having a peripheral annular depression, means for delivering an article to the said depression, projections from the walls of said depression arranged to engage said article and co-operate with the bottom of the depression to support the article and carry it away from the said delivery means, a flame projecting device, means for feeding a strip of solder along the line intersecting the axis of the flame from said device, and means for moving the article into the flame beyond the intersection of the flame and solder, and there rotating it upon an axis perpendicular to the flame of the solder and the flame.

11. In combination, a rotatable carrier having a peripheral annular depression, means for delivering an article to the said depression, projections from the walls of said depression arranged to engage said article and co-operate with the bottom of the depression to support the article and carry it away from said delivery means, means for causing the carrier to be intermittently rotated through a plurality of small arcs about a relatively remote axis, means for rotating the article about its own axis, the rotation about the remote axis of the carrier interrupting the rotation of the article about the axis of the article, and means for causing the article to be ejected from the carrier at a predetermined time.

12. In combination, a carrier equipped with an annular channel on its periphery, means including a supply of articles for delivering articles into the said channel, each of the articles having dished ends and axial holes, gripping means on said carrier for engaging the articles in the said channel, said gripping means being adapted to fit in the dished ends of said articles, means for advancing said gripping means into the said dished ends to hold the said articles, centering means associated with the said gripping means to fit in said axial holes, and means for actuating said centering means in advance of said gripping means.

In witness whereof, I hereunto subscribe my name this 13th day of Sept., 1921.

LOUIS H. STEIN.